US009385826B2

(12) United States Patent
Koumoto

(10) Patent No.: US 9,385,826 B2
(45) Date of Patent: Jul. 5, 2016

(54) COMMUNICATION APPARATUS AND COMMUNICATION METHOD

(75) Inventor: Hisafumi Koumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 89 days.

(21) Appl. No.: 14/000,522

(22) PCT Filed: Feb. 21, 2011

(86) PCT No.: PCT/JP2011/053703
§ 371 (c)(1),
(2), (4) Date: Aug. 20, 2013

(87) PCT Pub. No.: WO2012/114436
PCT Pub. Date: Aug. 30, 2012

(65) Prior Publication Data
US 2013/0329753 A1 Dec. 12, 2013

(51) Int. Cl.
*H04J 3/06* (2006.01)
*H04L 12/26* (2006.01)
*H04L 12/403* (2006.01)

(52) U.S. Cl.
CPC ............ *H04J 3/0658* (2013.01); *H04L 12/403* (2013.01); *H04L 43/0858* (2013.01); *H04L 43/0864* (2013.01); *H04L 43/10* (2013.01)

(58) Field of Classification Search
None
See application file for complete search history.

(56) References Cited

U.S. PATENT DOCUMENTS

| | | | |
|---|---|---|---|
| 5,990,638 A | 11/1999 | Aoyama et al. | |
| 6,278,718 B1 * | 8/2001 | Eschholz | H04L 12/422 370/503 |
| 6,684,247 B1 * | 1/2004 | Santos et al. | 709/224 |
| 6,717,916 B1 * | 4/2004 | Ahn et al. | 370/252 |

(Continued)

FOREIGN PATENT DOCUMENTS

| | | | |
|---|---|---|---|
| JP | 03-123229 A | 5/1991 | |
| JP | 05-030126 A | 2/1993 | |

(Continued)

OTHER PUBLICATIONS

Microsoft. MCSE Training Kit: Networking Essentials Plus, Third Edition. Chapter 3, Lesson 4: Token Ring. Published Nov. 10, 1999, ISBN 9781572319028.*

(Continued)

*Primary Examiner* — Jeffrey M Rutkowski
*Assistant Examiner* — Andre Tacdiran
(74) *Attorney, Agent, or Firm* — Sughrue Mion, PLLC; Richard C. Turner

(57) ABSTRACT

A managing station comprises a delay time measuring unit that measures, while transmitting a delay time measurement frame to each of the slave stations and receiving a response frame responsive to the delay time measurement frame from the slave station, an elapsed time from when transmitting the delay time measurement frame to when receiving the response frame and that calculates a delay time of the slave station; and a delay detecting unit that compares the calculated delay time and a delay judgment value that is an average of the delay times calculated in a past for the slave station to determine whether delay is occurring in the slave station for each of the slave stations and that identifies, if delay is occurring in the slave station, the position of a delay element using connection configuration information indicating connection states between the communication apparatuses in the network.

16 Claims, 7 Drawing Sheets

(56) References Cited

U.S. PATENT DOCUMENTS

| | | | |
|---|---|---|---|
| 6,850,491 B1* | 2/2005 | Firoiu et al. | 370/235 |
| 2002/0152303 A1* | 10/2002 | Dispensa | 709/224 |
| 2004/0153534 A1* | 8/2004 | Gibart | H04L 69/40 |
| | | | 709/223 |
| 2004/0252646 A1* | 12/2004 | Adhikari | H04L 43/12 |
| | | | 370/252 |
| 2006/0092850 A1* | 5/2006 | Neidhardt et al. | 370/252 |
| 2008/0222275 A1* | 9/2008 | Yumoto | H04L 12/433 |
| | | | 709/220 |
| 2008/0232266 A1* | 9/2008 | Jitsui et al. | 370/252 |
| 2009/0005054 A1* | 1/2009 | Moritomo | H04W 72/0486 |
| | | | 455/450 |
| 2009/0168645 A1* | 7/2009 | Tester et al. | 370/225 |
| 2011/0063979 A1* | 3/2011 | Matthews et al. | 370/237 |

FOREIGN PATENT DOCUMENTS

| | | |
|---|---|---|
| JP | 10-013394 A | 1/1998 |
| JP | 10-334027 A | 12/1998 |
| JP | 2000-069009 A | 3/2000 |
| JP | 2000-115213 A | 4/2000 |
| JP | 2004-228828 A | 8/2004 |
| JP | 2007-178226 A | 7/2007 |
| KR | 10-1995-7001166 A | 2/1995 |
| WO | 94/17604 A1 | 8/1994 |

OTHER PUBLICATIONS

Communication dated Jul. 16, 2014, issued by the Korean Intellectual Property Office in counterpart Korean application No. 10-2013-7024577.

International Search Report for PCT/JP2011/053703 dated Mar. 15, 2011.

Communication dated Jun. 3, 2015 from the State Intellectual Property Office of the People's Republic of China in counterpart application No. 201180068203.9.

Communication dated Jul. 28, 2015 from the Korean Intellectual Property Office issued in corresponding Korean application No. 1020137024577.

* cited by examiner

COMMUNICATION APPARATUS AND COMMUNICATION METHOD

FIELD

The present invention relates to a communication apparatus and a communication method.

In conventional communication systems, in order for a managing station to make slave stations synchronize in operation, the managing station sends out a synchronization frame to each slave station, and the slave station having received it starts processing upon the reception.

For example, where a communication system is formed of a line-type network, the reaching time when the synchronization frame from the managing station reaches the slave station differs for each slave station due to the influence of transfer processing times in slave stations arranged in the path and transmission delay times in the cables connecting communication apparatuses.

In order to correct for the difference in the reaching time of the synchronization frame, each slave station finds out the delay time that it takes for the synchronization frame to reach the slave station, is given an offset value corresponding to the delay time, and adds the offset value to the reaching time, thereby making synchronization time be the same for each slave station. As the method with which each slave station finds out the delay time, there is known a method that measures the transmission time of a particular signal sent back and forth between the managing station and each slave station to obtain a transmission delay time from this transmission time (refer to, e.g., Patent Literature 1).

CITATION LIST

Patent Literature

Patent Literature 1: Japanese Patent Application Laid-Open Publication No. H10-13394

SUMMARY

Technical Problem

In the above conventional art, when unexpected delay has occurred because a slave station on the network has failed or a hub has been added, if the synchronization frame is sent out without a delay due to that delay being taken into account, then the time when the synchronization frame reaches slave stations subsequent to the failed slave station or the added hub, as seen from the managing station, becomes later, so that an event where the synchronization time is not the same (loss of synchronization) occurs. However, there is the problem that, if such an unexpected delay element has occurred, the occurred place cannot be identified.

The present invention was made in view of the above facts, and an object thereof is to provide a communication apparatus and communication method which can detect the occurrence of unexpected delay and identify the occurred place of the delay element in a communication system where a managing station and multiple slave stations are connected via transmission paths and where communication is performed with maintaining synchronization between the slave stations.

Solution to Problem

There is provided a communication apparatus to be connected to a plurality of slave stations via a network and to manage a logical ring on the network and to communicate with the slave stations at a predetermined communication cycle, comprising: a communication unit that communicates with the slave stations; a delay time measuring unit that, while transmitting a delay time measurement frame to each of the slave stations via the communication unit and receiving a response frame to the delay time measurement frame from the slave station via the communication unit, measures elapsed time from when transmitting the delay time measurement frame to when receiving the response frame, and calculates a half of the measured elapsed time as a delay time of the slave station; and a delay detecting unit that compares the delay time calculated by the delay time measuring unit and a delay judgment value that is an average of the delay times calculated in a past for the slave station to determine whether delay is occurring in the slave station for each of the slave stations, and identifies, if delay is occurring in the slave station, the position of a delay element using connection configuration information indicating connection states between the communication apparatus and the plurality of slave stations in the network.

Advantageous Effects of Invention

According to the present invention, when the delay time of a slave station is greater than an average delay time measured in the past, it is determined that a delay element is occurring, and its place is identified with use of connection configuration information. Hence, the present invention has the effect that if unexpected delay has occurred on the network because of a failure in or addition of a slave station, it can be immediately determined where the delay element has occurred.

DESCRIPTION OF EMBODIMENTS

A preferred embodiment of the communication apparatus and communication method according to the present invention will be described in detail below with reference to the accompanying drawings. Note that this embodiment is not intended to limit the present invention.

Figure 1:
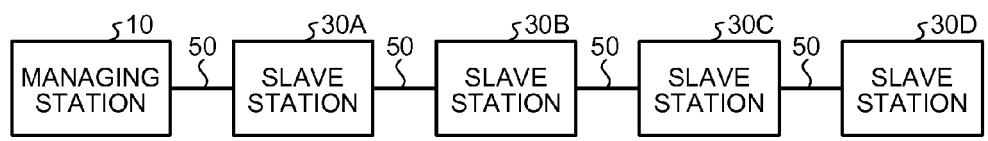
FIG. 1 is a diagram schematically showing an example of the configuration of a communication system according to an embodiment of the present invention.

FIG. 1 is a diagram schematically showing an example of the configuration of a communication system according to the embodiment of the present invention. In the communication system, one managing station 10 and multiple slave stations 30 (30A to 30D) are connected by transmission paths 50 and form a network. In this example, four slave stations 30A to 30D are connected in line to the managing station 10. The managing station 10 manages the order (a logical ring) in which to give a communication right on the network and manages communication such that communication is performed at a predetermined communication cycle. The managing station 10 transmits, e.g., to the slave stations 30A to 30D control data to drive controlled objects to be connected to the slave stations 30A to 30D at a predetermined communication cycle, and the slave stations 30A to 30D control the controlled objects based on the control data and transmit the status data indicating the control status of the controlled objects to the managing station 10 at a predetermined communication cycle.

Figure 2:
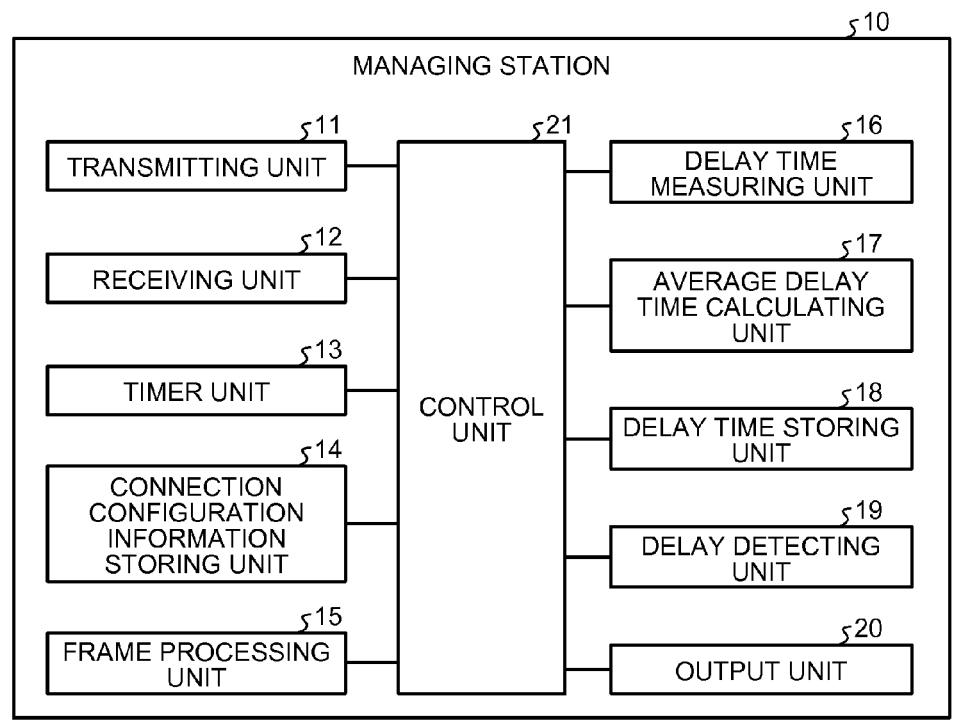
FIG. 2 is a diagram schematically showing an example of the configuration of a managing station according to the embodiment.

FIG. 2 is a diagram schematically showing an example of the configuration of the managing station according to the embodiment. The managing station 10 comprises a transmitting unit 11, a receiving unit 12, a timer unit 13, a connection configuration information storing unit 14, a frame processing unit 15, a delay time measuring unit 16, an average delay time calculating unit 17, a delay time storing unit 18, a delay detecting unit 19, an output unit 20, and a control unit 21 that controls each of those units.

The transmitting unit 11 transmits frames generated by the frame processing unit 15 or a delay-time measurement frame (hereinafter called a measurement frame) generated by the delay time measuring unit 16, and the receiving unit 12 receives frames destined for its own station. The transmitting unit 11 and the receiving unit 12 form a communication unit. The timer unit 13 is used when measuring a transmission delay time (hereinafter called a delay time) of each slave station 30A to 30D, is started when transmitting a measurement frame, and is stopped when receiving a delay-time measurement response frame (hereinafter called a response frame).

The connection configuration information storing unit 14 stores connection configuration information (network topology information) of the communication apparatuses in the communication system. For example, in the communication system shown in FIG. 1, in it stored is connection configuration information indicating that the slave station 30A is connected to the managing station 10, that the slave station 30B is connected to the slave station 30A, that the slave station 30C is connected to the slave station 30B, and that the slave station 30D is connected to the slave station 30C.

The frame processing unit 15 generates frames to be transmitted to the slave stations 30A to 30D and outputs them to the transmitting unit 11, and performs a reception process for making data in a frame received by the receiving unit 12 be, e.g., usable to the other units. In normal processing, the frame processing unit 15 generates a synchronization frame including control data and the like for each slave station 30A to 30D at a predetermined communication cycle and obtains status data from a frame received from each slave station 30A to 30D.

The delay time measuring unit 16 measures the delay time of each slave station 30A to 30D. Specifically, the delay time measuring unit 16 generates a measurement frame and starts timing operation of the timer unit 13 when the transmitting unit 11 transmits it to one slave station 30, and upon receiving a response frame that is a response to the measurement frame from the slave station 30 by the receiving unit 12, stops timing operation of the timer unit 13 to take half of the timer value counted by the timer unit 13 as the delay time of each slave station 30. The delay time measuring unit 16 performs this process sequentially for all the slave stations 30A to 30D present in the network based on the connection configuration information stored in the connection configuration information storing unit 14.

The average delay time calculating unit 17 calculates an average delay time that is a delay judgment value for each slave station 30A to 30D using the delay times calculated by the delay time measuring unit 16 in the past and stores it in the delay time storing unit 18. Further, the delay time storing unit 18 stores average delay time information in which the slave stations 30A to 30D are associated with their average delay times.

For example, as the average delay time, the average value of results of performing delay time measurement a predetermined number of times at the start of the communication system may be used, after that, the average value may be used fixedly until the communication system is initialized. In this case, the average delay time is not updated until the communication system is initialized next time.

Alternatively, as the average delay time, the average value of delay times measured a predetermined number of times over a period from the present into the past may be obtained. In this case, as to the method of determining the number of times, the number of times may be variable according to the length of the delay time, or may be variable according to the amount of variation in the average value calculated. In this case, for example, results of measuring the delay time a predetermined number of times, together with the average delay time, are stored being associated with the slave stations 30A to 30D in the average delay time information. Further, the average delay time is updated each time measurement is performed.

Alternatively, as the average delay time, the average value of delay times measured a number of times over a period from a predetermined time may be used. Here, the predetermined time may be a time when all the slave stations 30A to 30D in the network start operating or a time when the occurrence of unexpected delay has been detected in any of the slave stations 30A to 30D.

The delay detecting unit 19 compares the delay time calculated by the delay time measuring unit 16 and the average delay time stored in the delay time storing unit 18 to determine whether a delay element has occurred in the network, and if detecting the occurrence of a delay element, identifies its place. Specifically, if the delay time deviates from the average delay time by a predetermined proportion, then the delay detecting unit 19 determines that delay is occurring. Further, the delay detecting unit 19 identifies the occurred place of the delay element from the presence/non-presence of delay in each slave station 30A to 30D and the connection configuration information indicating the connection states of the slave stations 30A to 30D. By what degree the delay time deviates from the average delay time when it is determined that delay is occurring, is decided for each network, and the reference to determine that a delay element has occurred can be set such that if the delay time changes by, e.g., 10% of the average delay time or 50% thereof, the detecting unit determines so. Or, rather than detecting delay with use of the proportion of deviation, it may be determined that delay is occurring if the difference between the delay time and the average delay time is greater than or equal to a predetermined value.

The output unit 20 outputs a warning when the delay detecting unit 19 has detected the occurrence of a delay element. For example, a display function (warning indication unit) such as an LED (Light-Emitting Diode) may be provided in the managing station 10 to be lit, or an LED as a warning indication unit of the slave station 30A to 30D near the place where a delay element has occurred or an LED as a warning indication unit of the slave station 30A to 30D where a delay element has occurred may be lit. Or, those LEDs may be lit at the same time. Or, where the output unit 20 is constituted by a display device, with the connection relation of each communication apparatus obtained from the connection configuration information being displayed, the occurred place of a delay element may be displayed being laid over the connection relations of the communication apparatuses.

The slave stations 30A to 30D used in this communication system are the same in configuration as slave stations 30A to 30D used to realize usual synchronous communication except that they immediately sends a response frame destined for the managing station 10 when receiving a measurement frame, and hence description thereof is omitted.

Next, processes in this communication system will be described. Description will be made in the order of a delay time measuring process, an average delay time calculating process, and a delay detecting process.

<Delay Time Measuring Process>

Figure 3:
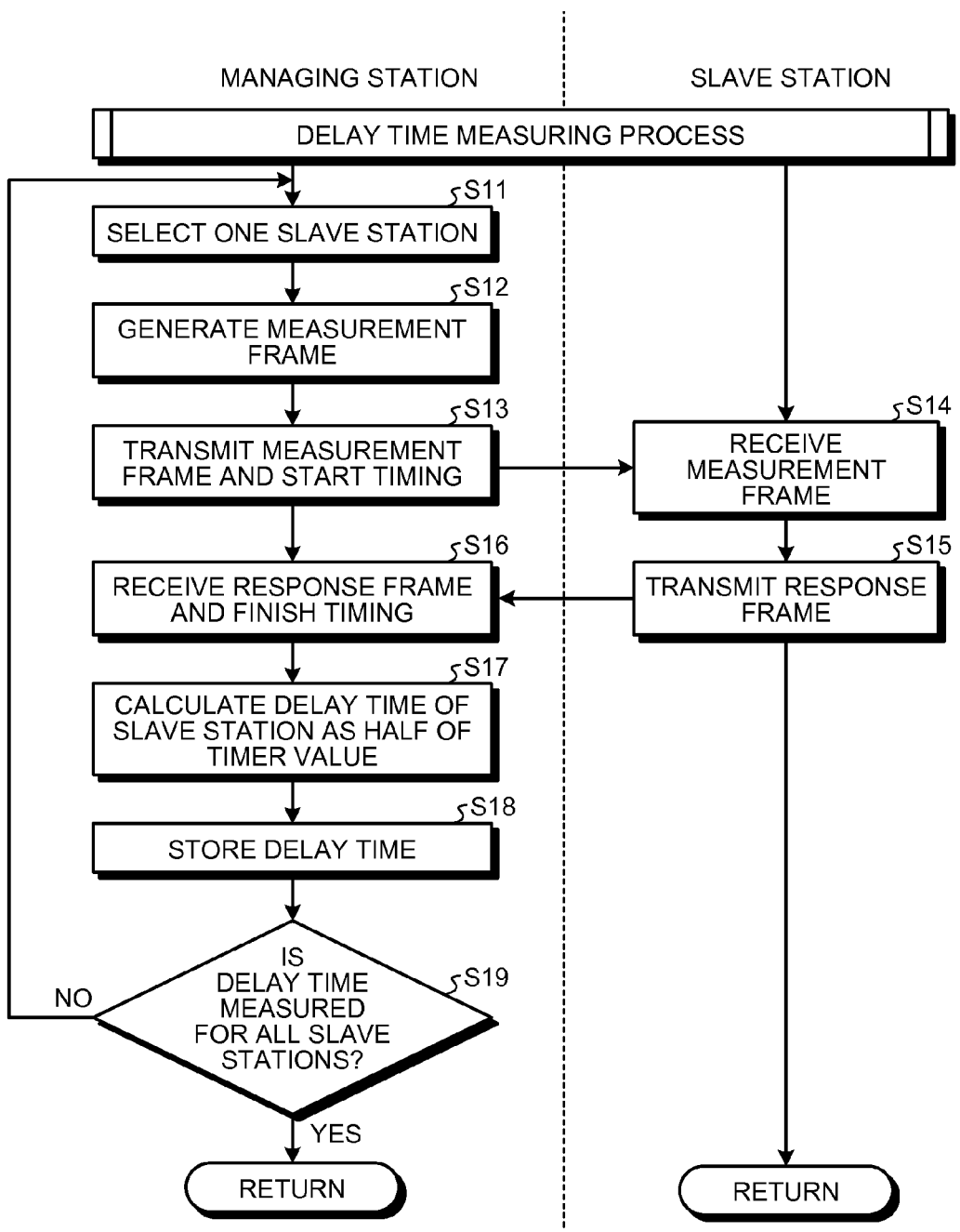
FIG. 3 is a flow chart showing an example of the procedure of a delay time measuring process.

FIG. 3 is a flow chart showing an example of the procedure of the delay time measuring process. First, the delay time measuring unit 16 of the managing station 10 selects one slave station 30 from the connection configuration information stored in the connection configuration information storing unit 14 (step S11), and generates a measurement frame to be destined for that slave station 30 (step S12). Then, the delay time measuring unit 16 has the transmitting unit 11 transmit the measurement frame and at the same time starts timing operation of the timer unit 13 (step S13).

The slave station 30, when having received the measurement frame (step S14), immediately transmits a response frame to the managing station 10 (step S15). At the same time that the receiving unit 12 of the managing station 10 receives the response frame from the slave station 30 to which it transmitted the measurement frame at step S13, the delay time measuring unit 16 stops timing operation of the timer unit 13 (step S16). Then, the delay time measuring unit 16 calculates the delay time of the slave station 30 selected at step S11 as half of the timer value of the stopped timer unit 13 (step S17). The calculated delay time is stored being associated with the slave station 30 in the delay time storing unit 18 (step S18). At this time, the timer value is reset.

Then, the delay time measuring unit 16 of the managing station 10 determines whether the delay time is measured for all the slave stations 30 in the network (step S19), and if the delay time is not measured for all the slave stations 30 (No at step S19), then the process returns to step S11, and the above process is repeatedly performed. If the delay time is measured for all the slave stations 30, then the process ends.

Figure 4:
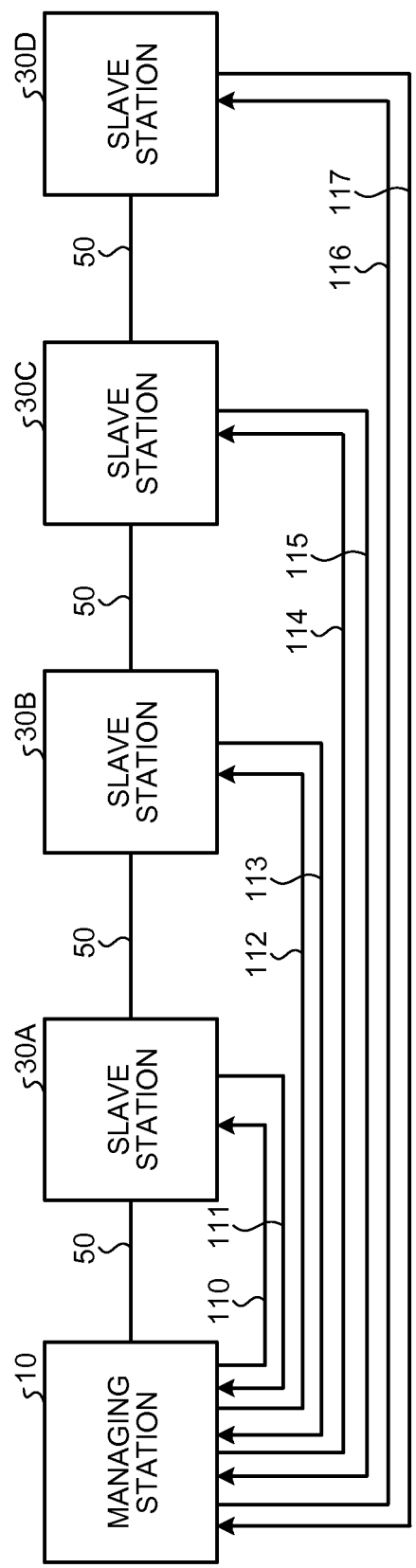
FIG. 4 is a diagram showing the outline of the delay time measuring process.

FIG. 4 is a diagram showing the outline of the delay time measuring process. For example, in the case of the network configuration shown in FIG. 1, the delay time measuring process is performed as shown in FIG. 4. That is, at first, the managing station 10 selects the slave station 30A and transmits a measurement frame 110 to the slave station 30A and at the same time starts timing operation of the timer unit 13. When having received the measurement frame 110, the slave station 30A immediately transmits a response frame 111 to the managing station 10. When having received the response frame 111, the managing station 10 stops timing operation of the timer unit 13. Then, the managing station 10 calculates a half of the timer value as the delay time of the slave station 30A and stores the calculated delay time.

Then, the managing station 10 selects the slave station 30B, and using a measurement frame 112 and a response frame 113 likewise between itself and the slave station 30B, calculates the delay time of the slave station 30B and stores the delay time. Subsequently, the managing station 10 sequentially selects the slave stations 30C, 30D, and likewise calculates the delay times of the slave stations 30C, 30D and stores them. After storing the delay time of the slave station 30D, the managing station 10 finishes the delay time measuring process because no other slave station exists in the network.

<Average Delay Time Calculating Process>

Here, description will be made taking as an example the case where the average delay time is calculated after the delay time measuring process is performed a predetermined number of times like the case where the average delay time calculating process is performed after the communication system is initialized.

Figure 5:
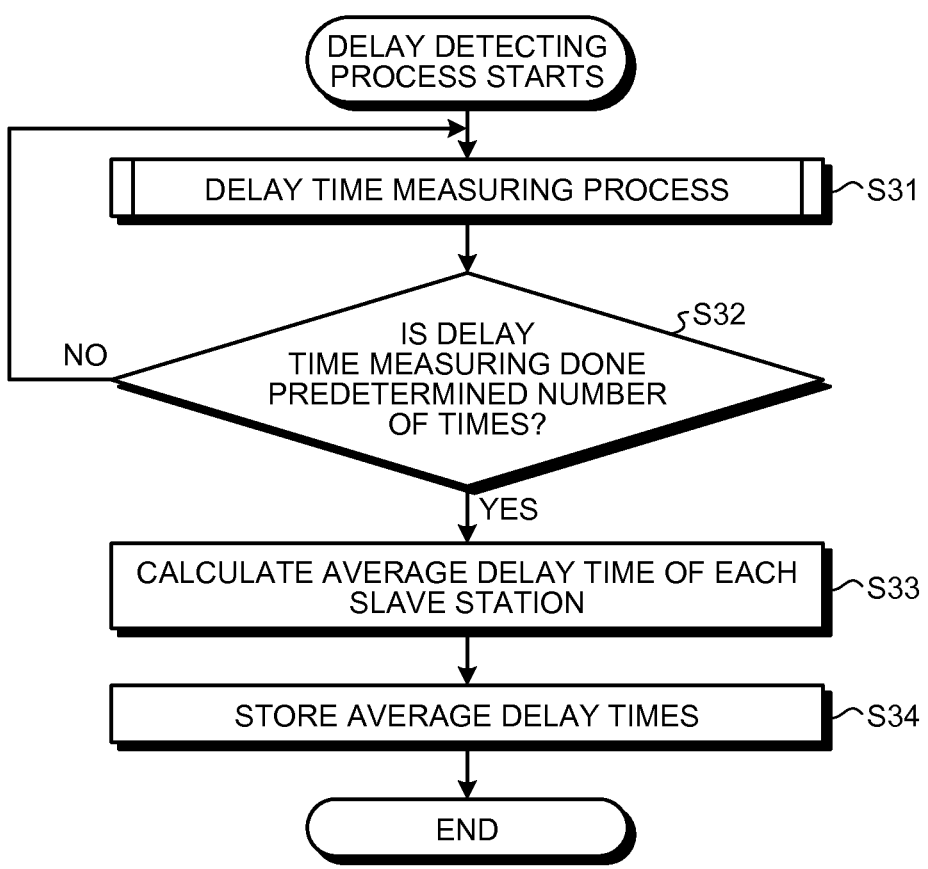
FIG. 5 is a flow chart showing an example of the procedure of an average delay time calculating process.

FIG. 5 is a flow chart showing an example of the procedure of the average delay time calculating process. First, the delay time measuring unit 16 of the managing station 10 performs the delay time measuring process (step S31). This delay time measuring process is the process shown in the flow chart of FIG. 3. Then, the delay time measuring unit 16 of the managing station 10 determines whether the delay time measuring process has been performed a predetermined number of times (step S32). If the delay time measuring process has not been performed a predetermined number of times (No at step S32), then the delay time measuring unit 16 returns to step S31. If the delay time measuring process has been performed a predetermined number of times (Yes at step S32), then the average delay time calculating unit 17 takes the average of the delay times for the predetermined number of times stored in the delay time storing unit 18 for each slave station 30 to obtain the average delay time (step S33). Then, the average delay times are stored being associated with the slave stations 30 in the delay time storing unit 18 (step S34), and the average delay time calculating process finishes.

<Delay Detecting Process>

Figure 6:
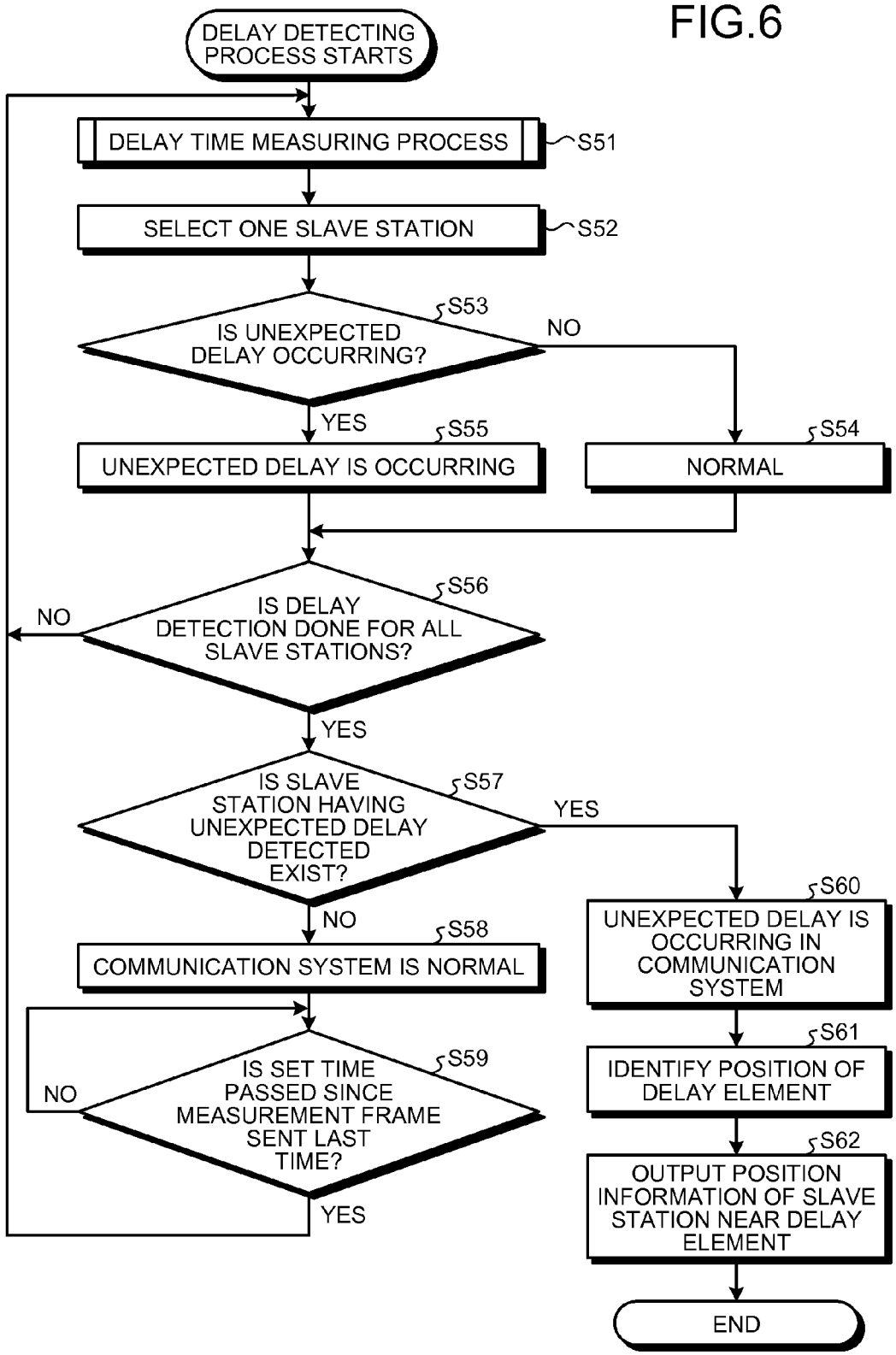
FIG. 6 is a flow chart showing an example of the procedure of a delay detecting process.

FIG. 6 is a flow chart showing an example of the procedure of the delay detecting process. First, the delay time measuring unit 16 of the managing station 10 performs the delay time measuring process (step S51). This delay time measuring process is the process shown in the flow chart of FIG. 3. Then, the delay detecting unit 19 selects one slave station 30 from the connection configuration information stored in the connection configuration information storing unit 14 (step S52), and compares the delay time calculated by the delay time measuring process and the average delay time in the delay time storing unit 18 to determine whether unexpected delay is occurring (step S53).

If unexpected delay is not occurring (No at step S53), it is determined that that slave station 30 is in a normal state (step S54). On the other hand, if unexpected delay is occurring (Yes at step S53), it is determined that unexpected delay is occurring in that slave station 30 (step S55).

Thereafter or after step S54, it is determined whether the delay detecting process has been performed for all the slave stations 30 (step S56), and if the delay detecting process has not been performed for all the slave stations 30 (No at step S56), then the process returns to step S51.

If the delay detecting process has been performed for all the slave stations 30 (Yes at step S56), then it is determined whether there is at least one slave station 30 in which unexpected delay has been detected (step S57). If there is no slave station 30 in which unexpected delay has been detected (No at step S57), then it is determined that the communication system is in a normal state where an unexpected delay is not occurring as much as to cause loss of synchronization (step S58). Then, it is determined whether a predetermined time has passed since a measurement frame was transmitted last time (step S59), and if the predetermined time has not passed (No at step S59), then the delay detecting unit 19 goes into a wait state. If the predetermined time has passed (Yes at step S59), then the process returns to step S51.

On the other hand, if there is at least one slave station in which unexpected delay has been detected at step S57 (Yes at step S57), then it is determined that in the communication system, so much unexpected delay is occurring as to cause loss of synchronization (step S60). Then, the delay detecting unit 19 identifies the position of the delay element using the connection configuration information stored in the connection configuration information storing unit 14 (step S61). For example, it can be thought that on the connection configuration information, the delay element exists at the boundary between a slave station 30 in which unexpected delay has been detected and a slave station 30 in which unexpected delay has not been detected or that the delay element exists in the slave station 30 in which unexpected delay has been detected that is the closest to that boundary. Then, the delay detecting unit 19 outputs the position information of the slave station 30 close to the delay element (step S62). For example, in the above example, the slave station 30 in which unexpected delay has been detected and the slave station 30 in which unexpected delay has not been detected on opposite sides of the above boundary are acquired as slave stations 30 close to the delay element. Then, the output unit 20 of the managing station 10 can light a warning indication light such as an LED provided in its own station, or light a warning indication light such as an LED provided in the slave station 30 in which unexpected delay has been detected, or display a connection state diagram based on the connection configuration information on a displaying unit such as a liquid crystal display provided in its own station and display the occurred place of the delay element laid over the diagram. This finishes the delay detecting process.

Note that if unexpected delay has been detected, the delay detecting unit 19 of the managing station 10 may stop communication in the communication system, or the delay detecting unit 19 of the managing station 10 may store, as a new average delay time, the delay time calculated at step S51 for the slave station 30 where delay is determined to have occurred in the delay time storing unit 18 so as to perform the delay detecting process based on that value. Further, the delay detecting unit 19 can efficiently identify the occurred place of the delay element by performing the delay time measuring process in the order from a slave station 30 closest to the delay element using the connection configuration information.

Figure 7:
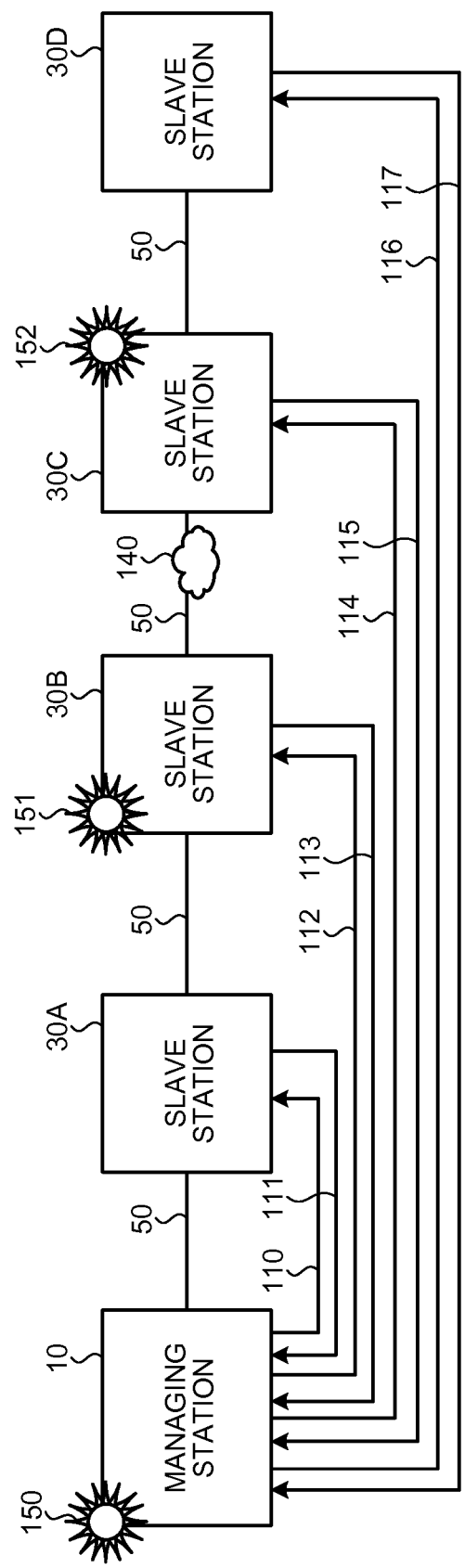
FIG. 7 is a diagram schematically showing an example of the operation of the communication system in the case where a delay element has occurred on the network.

FIG. 7 is a diagram schematically showing an example of the operation of the communication system in the case where a delay element has occurred on the network. Here, it is assumed that in the communication system of FIG. 1, some delay element 140 has occurred between the slave stations 30B and 30C. That is, delay times calculated from measurement of the time from when the managing station 10 transmits measurement frames 110, 112 respectively to the slave stations 30A and 30B to when receiving response frames 111, 113 are within a predetermined range as compared with the average delay times of the slave stations 30A and 30B stored in the delay time storing unit 18. In contrast, delay times calculated from measurement of the time from when the managing station 10 transmits measurement frames 114, 116 respectively to the slave stations 30C and 30D to when receiving response frames 115, 117 are detected to greatly deviate from the predetermined range as compared with the average delay times of the slave stations 30C and 30D stored in the delay time storing unit 18. At this time, unexpected delay is not occurring in the slave station 30B, and unexpected delay is occurring in the slave station 30C. Hence, it is determined that the delay element 140 is occurring on the transmission path 50 between the slave stations 30B and 30C or in the slave station 30C. Then, a warning indicating the occurrence of the delay element 140 is output to the output unit 20. For example, a warning indication light 150 provided in the managing station 10 may be lit, or warning indication lights 151, 152 provided in the slave station 30B and/or the slave station 30C close to the occurred place of the delay element 140 may be lit.

Note that, although in the above example description has been made of the network configuration where the managing station 10 and the slave stations 30A to 30D are connected in line, the present invention is not limited to this, but can be applied to star-type networks and line-type star-type mixed networks.

Figure 8:
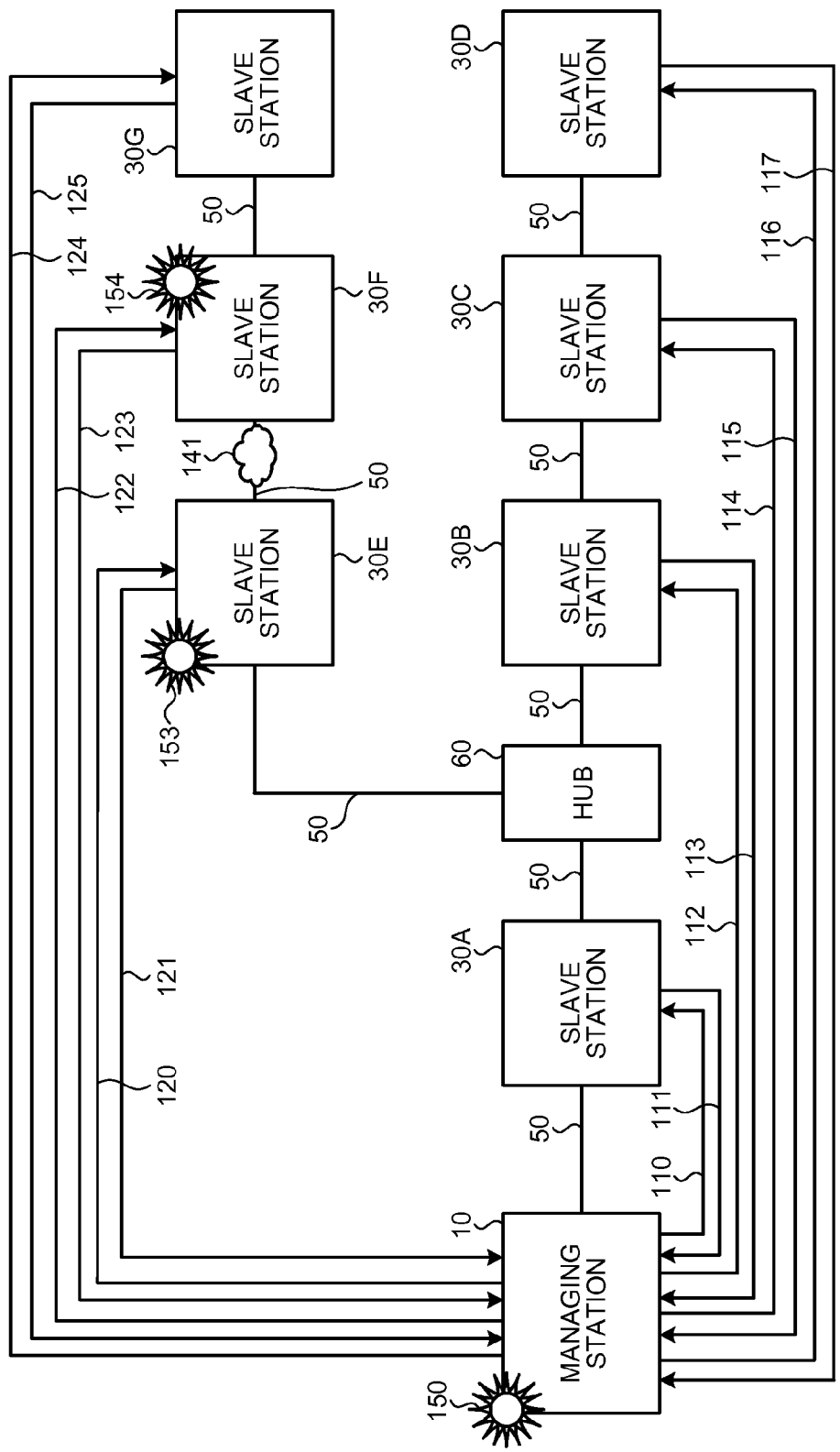
FIG. 8 is a diagram schematically showing an example of the operation of the communication system in the case where a delay element has occurred on a line-type star-type mixed network.

FIG. 8 is a diagram schematically showing an example of the operation of the communication system in the case where a delay element has occurred on a line-type star-type mixed network. This example shows one where a hub 60 is provided between the slave stations 30A and 30B in the network of FIG. 1 and where slave stations 30E to 30G are further connected in line to the hub 60. After the delay time measuring process is performed on the slave stations 30A to 30D in the same way as described with reference to FIGS. 4 and 7, the delay time measuring process is performed sequentially on the slave stations 30E to 30G with measurement frames 120, 122, 124 and response frames 121, 123, 125 thereto being transmitted/received.

Here, it is assumed that some delay element 141 has occurred between the slave stations 30E and 30F. That is, a delay time calculated from measurement of the time from when the managing station 10 transmits a measurement frame 120 to the slave station 30E to when receiving a response frame 121 is within a predetermined range as compared with the average delay time of the slave station 30E stored in the delay time storing unit 18. In contrast, a delay time calculated from measurement of the time from when the managing station 10 transmits a measurement frame 122 to the slave station 30F to when receiving a response frame 123 is detected to greatly deviate from the predetermined range as compared with the average delay time of the slave station 30F stored in the delay time storing unit 18. At this time, unexpected delay is not occurring in the slave station 30E, and unexpected delay is occurring in the slave station 30F. Hence, it is determined that the delay element 141 is occurring on the transmission path 50 between the slave stations 30E and 30F or in the slave station 30F. Then, a warning indicating the occurrence of the delay element 141 is output to the output unit 20. For example, a warning indication light 150 provided in the managing station 10 may be lit, or warning indication lights 153, 154 provided in the slave station 30E and/or the slave station 30F close to the occurred place of the delay element 141 may be lit.

This embodiment has the effect that if unexpected delay has occurred on the network because of a failure in or addition of a slave station 30, it can be immediately determined where the delay element has occurred and that the occurred place of the delay element can be shown visually by warning indication.

INDUSTRIAL APPLICABILITY

As described above, the communication apparatus according to this invention is useful for networks where data is exchanged periodically.

REFERENCE SIGNS LIST

10 Managing station
11 Transmitting unit
12 Receiving unit
13 Timer unit
14 Connection configuration information storing unit
15 Frame processing unit
16 Delay time measuring unit
17 Average delay time calculating unit
18 Delay time storing unit
19 Delay detecting unit
20 Output unit
21 Control unit
30, 30A to 30G Slave station
50 Transmission path
60 Hub

The invention claimed is:

1. A communication apparatus connected to a plurality of slave stations via a network, comprising:
a transmitter and a receiver configured to communicate with the plurality of slave stations; and
a processor configured to:
in response to the transmitter transmitting a delay time measurement frame to each of the plurality of slave stations and the receiver receiving a response frame to the delay time measurement frame from said each of the plurality of slave stations, measure, for said each of the plurality of slave stations, an elapsed time from a first point in time in which the transmitter transmitted the delay time measurement frame to a second point in time in which the receiver received the response frame, and calculate an individual delay time for said each of the plurality of slave stations based on the measured elapsed time for said each of the plurality of slave stations,
compare said individual delay time for said each of the plurality of slave stations with an individual delay judgment value, wherein the individual delay judgement is an average of individual delay times calculated in previous communication cycles for a respective slave station, wherein the individual delay time of a current cycle is received after the individual delay times of the previous communication cycles,
determine whether an abnormal delay is occurring in at least one of the plurality of slave stations,
in response to the determining that the abnormal delay is occurring, identifying a position of a delay element using connection configuration information indicating connection states between the communication apparatus and the plurality of slave stations in the network, and
in response to the determining that the abnormal delay is not occurring, updating the individual delay judgement by recalculating the average of the individual delay times using the calculated individual delay time of the current communication cycle and the delay times of the previous communication cycles,
wherein, in response to the identified delay element being in a faulty slave station from among the plurality of slave stations, the transmitter transmits a warning indication to the faulty slave station in which the determined abnormal delay has been identified,
wherein, in response to the identified delay element being not in one of the plurality of slave stations and being between two of the plurality of slave stations, the transmitter transmits the warning indication to an adjacent slave station from among the plurality of slave stations, which is adjacent to the identified delay element, and
wherein, in response to the warning indication, one of the faulty slave station and the adjacent slave station is configured to output an alarm showing an occurrence of the determined abnormal delay.

2. The communication apparatus according to claim 1, further comprising: a display configured to display the identified position of the delay element on a diagram of the connection states between the communication apparatus and the plurality of slave stations based on the connection configuration information.

3. The communication apparatus according to claim 1, wherein: in response to the calculated individual delay time deviating from the individual delay judgment value by a predetermined amount or proportion, the processor is further configured to set the calculated delay time as a new delay judgment value for the respective slave station.

4. The communication apparatus according to claim 1, wherein
the network is at least one of: a line type network and a star type network.

5. A communication method in a communication system where a managing station and a plurality of slave stations are connected via a network, the method comprising:
transmitting, by the managing station, a delay time measurement frame to a slave station from the plurality of slave stations;
starting a timing operation in response to the transmitting of the delay time measurement frame to measure an elapsed time;
receiving, by the managing station, a response frame responsive to the delay time measurement frame from the slave station;
stopping the timing operation in response to the receiving of the response frame to measure the elapsed time;
calculating a delay time of the slave station in a current communication cycle, based on the measured elapsed time;
comparing the calculated delay time with a delay judgment value that is an average of individual delay times calculated in previous communication cycles using the timing operation for the slave station, wherein the calculated delay time of the current cycle is received after the individual delay times of the previous communication cycles;
determining whether an abnormal delay is occurring in the slave station based on the comparing;
in response to the determining indicating that the abnormal delay is occurring in the slave station, identifying a position of a delay element using connection configuration information indicating connection states between the managing station and the plurality of slave stations in the network; and
in response to the determining indicating that the abnormal delay is not occurring, updating the delay judgment by recalculating the average of the individual delay times using the calculated delay time in the current cycle and the individual delay times of the previous communication cycles,
wherein the transmitting, the starting, the receiving, the stopping, the calculating, the comparing, and the determining is performed for each of the slave stations,
wherein, in response to the identified delay element being in a faulty slave station from among the plurality of slave stations, transmitting a warning indication to the faulty slave station in which the determined abnormal delay has been identified, wherein, in response to the identified delay element being not in one of the plurality of slave stations and being between two of the plurality of slave stations, transmitting the warning indication to an adjacent slave station from among the plurality of slave stations, which is adjacent to the identified delay element, and wherein, in response to the warning indication, one of the faulty slave station and the adjacent slave station is configured to output an alarm showing an occurrence of the determined abnormal delay.

6. The communication method according to claim 5, further comprising: displaying the identified position of the delay element on a diagram of the connection states between the communication apparatus and the plurality of slave stations based on the connection configuration information.

7. The communication method according to claim 5, wherein the determining comprises, in response to the calculated delay time deviating from the delay judgment value by a predetermined amount or proportion, setting the calculated delay time as a new delay judgment value.

8. The communication method according to claim 5, wherein the network is at least one of a line type network and a star type network.

9. The communication apparatus according to claim 1, wherein the communication apparatus manages the network which forms a logical ring comprising the plurality of slave stations, communicates with the plurality of slave stations in a predetermined communication cycle, and synchronizes the plurality of slave stations.

10. The communication apparatus according to claim 1, wherein a faulty slave station is a slave station that is closer to the delay element than the remaining slave stations from the plurality of slave stations.

11. The communication apparatus according to claim 1, wherein the transmitter sequentially transmits the delay time measurement frame to said each of the plurality of slave stations and wherein the processor further comprises a timer which measures the elapsed time from a respective delay time measurement frame to a response frame for the respective slave station for said each of the plurality of slave stations and wherein the transmitter transmits to said each of the plurality of slave stations a synchronization frame to synchronize operations of the plurality of slave stations with each other.

12. The communication apparatus according to claim 1, in response to the processor determining that at least two of the plurality of slave stations have the determined abnormal delay, the processor identifying the position of the delay element as occurring in a line between a first slave station without the determined abnormal delay and a second slave station, which has the determined abnormal delay and which is closest to the communication apparatus based on the connection configuration information.

13. The communication apparatus according to claim 1, wherein said each of the plurality of slave stations comprise a display configured to display a warning in response to the transmitter transmitting an indicator of the determined abnormal delay.

14. The communication apparatus according to claim 13, wherein the display is further configured to display a network topology with a location identifier of the identified position of the delay element based on receiving from the communication apparatus the identified position of the delay element.

15. The communication method of claim 5, wherein the identifying is performed after the transmitting, the starting, the receiving, the stopping, the calculating, the comparing, and the determined is performed for said each of the slave stations.

16. The communication method of claim 5, wherein the managing station maintains synchronization between the plurality of slave stations via transmitting a synchronization frame to said each of the plurality of slave stations, communicates with the plurality of slave stations in a predetermined communication cycle, and manages a logical ring on the network comprising at least one hub.

* * * * *